United States Patent
Saudagar et al.

(10) Patent No.: US 12,327,476 B1
(45) Date of Patent: Jun. 10, 2025

(54) SYSTEM AND METHOD FOR TASK SCHEDULING IN VEHICULAR FOG COMPUTING NETWORKS

(71) Applicant: IMAM MOHAMMAD IBN SAUD ISLAMIC UNIVERSITY, Riyadh (SA)

(72) Inventors: Abdul Khader Jilani Saudagar, Riyadh (SA); Muhammad Awais Javed, Islamabad (PK); Ahmad Naseem Alvi, Islamabad (PK)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 18/893,600

(22) Filed: Sep. 23, 2024

(51) Int. Cl.
| | |
|---|---|
| *G08G 1/0967* | (2006.01) |
| *G05D 1/227* | (2024.01) |
| *G08G 1/16* | (2006.01) |
| *H04W 4/40* | (2018.01) |

(52) U.S. Cl.
CPC ....... *G08G 1/096783* (2013.01); *G05D 1/227* (2024.01); *G08G 1/16* (2013.01); *H04W 4/40* (2018.02)

(58) Field of Classification Search
CPC ..... G08G 1/096783; G08G 1/16; H04W 4/40; G05D 1/227
See application file for complete search history.

(56) References Cited

U.S. PATENT DOCUMENTS

| | | | |
|---|---|---|---|
| 6,578,005 B1* | 6/2003 | Lesaint | G06Q 10/06 705/7.14 |
| 8,514,825 B1* | 8/2013 | Addepalli | H04W 12/03 370/338 |
| 2018/0188738 A1* | 7/2018 | Tatourian | G05D 1/0234 |
| 2020/0257310 A1* | 8/2020 | Du | H04W 4/46 |

(Continued)

FOREIGN PATENT DOCUMENTS

| | | |
|---|---|---|
| CN | 108848480 B | 10/2020 |
| CN | 118014305 A | 5/2024 |

OTHER PUBLICATIONS

Suvarthi Sarkar, et al., "QoS Aware Mixed-Criticality Task Scheduling in Vehicular Edge Cloud System". arXiv:2407.14793v1, Jul. 20, 2024, 12 pages.

(Continued)

*Primary Examiner* — Wissam Rashid
(74) *Attorney, Agent, or Firm* — Oblon, McClelland, Maier & Neustadt, L.L.P.

(57) ABSTRACT

A system for scheduling vehicle tasks for vehicles is described. The system includes a plurality of vehicles having the advanced driver assistance systems and cellular vehicle-to-everything communication, and a plurality of road side unit (RSU) nodes arranged at predetermined locations to execute driver assist tasks. The system further includes a central base station configured to receive and dynamically maintain a record of task data rates between the vehicles and the RSUs and delay time to return an executed task, and schedule offloading of the tasks for the advanced driver assistance systems. The RSUs are fog nodes for computing the tasks in accordance with the schedule, and the tasks are control tasks for the advanced driver assistance systems.

18 Claims, 9 Drawing Sheets

(56) References Cited

U.S. PATENT DOCUMENTS

2023/0269766 A1* 8/2023 Guo .................. H04W 74/006
　　　　　　　　　　　　　　　　　　　　370/329
2023/0300579 A1　9/2023 Merwaday et al.

OTHER PUBLICATIONS

Muhammad Ehtisham, et al., "Internet of Vehicles (IoV)-Based Task Scheduling Approach Using Fuzzy Logic Technique in Fog Computing Enables Vehicular Ad Hoc Network (VANET)", Sensors, vol. 24, 874, Jan. 29, 2024, 34 pages.

* cited by examiner

SYSTEM AND METHOD FOR TASK SCHEDULING IN VEHICULAR FOG COMPUTING NETWORKS

BACKGROUND

Technical Field

The present disclosure is directed to vehicular networks and fog computing. In particular, the present disclosure is directed towards a system and a method for scheduling vehicle tasks for vehicular advanced driver assistance systems (ADAS) and automated driving operations.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

With the advent of civilization, road traffic has increased significantly. Specifically, motor vehicles, including commercial and private vehicles, constitute the majority of road traffic globally. In recent years, vehicles are being equipped with advanced driver assistance systems (ADAS) and various forms of communication. Leveraging the Internet of Things (IoT), different types of computing devices can have unique addresses and communicate with each other. Leveraging ADAS and vehicle communication, IoT is being applied to vehicles, and is referred to as the Internet of Vehicles (IoV). IoV is defined as vehicle nodes connect to an infrastructure based on Internet protocol (IP). Using the concept of IoV as a new paradigm of vehicular ad-hoc network (VANET), vehicles can communicate with external computing devices and people around them.

Over the last decade, research in autonomous driving vehicle technology is evolving with an ultimate goal of near fully autonomous levels, that can achieve near complete hands-off driving ability. Several levels of automation have been defined for autonomous driving vehicles. Levels of automation can include momentary driver assistance, driver assistance, additional driver assistance, conditional automation, high automation, and full automation. However, autonomous driving vehicle technology is largely a connected technology that relies on servers and on-grid infrastructure to perform driver assistance functions. Intelligent Transportation Systems (ITS) improve transportation safety and mobility by integrating advanced communication technologies into vehicles and infrastructure. Autonomous driving vehicle technology is a key application of ITS that may revolutionize transportation. VANET is one component of ITS, offering safety, ease of driving, and entertainment for vehicle occupants. VANET, or inter-vehicle communications (IVC) is a special form of Mobile Ad-hoc Network (MANET) that creates a self-organizing, scalable distributed network. In this network, vehicles move at high speeds, resulting in rapidly changing network topologies and vehicles without energy constraints.

Robust wireless communications and efficient computing are essential to enable the applications of ITS. ITS has three major components. The first component is vehicles equipped with wireless antennas for signal transmission and reception. The second component is road side equipment unit(s) (RSUs) that act as small base stations to maintain regular communications with the vehicles. The second component may also include fog computing nodes that provide caching and computing services to the vehicles. The third component is cloud computing (CC) technology.

Time-sensitive and real-time computing service requests often require immediate responses. The remoteness of the cloud can incur round-trip delays, network congestion, and reduced service quality. To address these issues, the fog computing paradigm has been employed to bridge the gap between the cloud and end devices, offering services with low latency and decreasing ingress traffic to the cloud. Fog computing is defined as a horizontal, physical or virtual resource paradigm that resides between smart end-devices and traditional cloud computing or data center.

In the case of ITS, a vehicular fog computing network is an approach that uses fog computing nodes that can be linked to vehicles. Vehicular fog computing may be implemented with Fog servers, positioned between vehicles and the cloud to collect data from vehicle sensors and generate real-time responses for delay-sensitive applications. The delay sensitive applications can include object recognition and route navigation that can involve highly complex computation that is beyond the capability of the vehicle's built-in computer. In such case, a vehicle may choose to offload computation and control tasks to the fog servers. However, despite advancements that utilize vehicular fog computing networks to perform computationally intensive tasks, there remains a need for an efficient system to schedule offloading of these complex computing and control tasks to Fog servers, especially considering that there may be a large number of various types of moving vehicles, particularly in environments with dense traffic flow.

Accordingly, it is one object of the present disclosure to provide systems and methods for scheduling offloading of vehicle tasks that involve computing of vehicular advanced driver assistance functions and automated driving operations by road side units, circumventing the drawbacks of traditional systems currently in use. A further object of the present disclosure is road side units connected to a central base station that maintains records of traffic related data and performs traffic management operations for various vehicles.

SUMMARY

In an exemplary embodiment, a system for scheduling vehicle tasks for vehicles is described. The system includes a plurality of vehicles having the advanced driver assistance systems and cellular vehicle-to-everything (C-V2X) communication circuitry, and a plurality of road side unit (RSU) nodes arranged at predetermined locations and configured to execute driver assist control tasks for the plurality of vehicles. The system further includes a central base station configured to receive and dynamically maintain a record of task data rates for C-V2X links between the plurality of vehicles and the plurality of RSUs, as RSU-vehicle links, and delay times to return an executed task, and schedule offloading of the control tasks from the plurality of vehicles to the RSU nodes by way of the RSU-vehicle links. The RSUs are fog nodes for computing the control tasks in accordance with a schedule.

In some embodiments, the plurality of vehicles are configured for diverse driver assist tasks, and a subset of the plurality of vehicles request to offload a respective diverse control task to an RSU.

In some embodiments, each RSU is configured to maintain channel capacity data and data rate data of different geographic locations in an RSU communication range by periodically monitoring a signal quality of a vehicle to RSU link for each vehicle of the plurality of vehicles using the cellular vehicle-to-everything communication circuitry.

In some embodiments, the plurality of vehicles are configured with a limited computation capacity and each RSU is configured with a computation capacity that is greater than the limited computation capacity of the plurality of vehicles.

In some embodiments, each RSU is configured to compute object recognition in order to avoid obstacles.

In some embodiments, each RSU is configured to maintain a history of data rates achieved by the plurality of vehicles as the plurality of vehicles move to different geographic locations within an RSU communication range.

In some embodiments, the central base station is configured to receive and maintain a history of variable data rates for the RSU-vehicle links.

In some embodiments, the central base station is configured to schedule requested offloading of the control tasks using a Hungarian-based algorithm for requested control tasks for offloading from the plurality of vehicles by different RSUs of the plurality of RSUs, and the central base station is configured to populate a cost matrix of the control tasks for each vehicle-RSU link and apply the Hungarian-based algorithm to schedule requested tasks for offloading to each RSU in a manner that minimizes a cost function.

In some embodiments, the central base station is configured to schedule offloading of requested tasks with minimum cost in terms of total task delay for each RSU-vehicle link, computed as sum of an expected task data rate, an expected task computation time by a RSU, and an expected delay time to return an executed task.

In some embodiments, the central base station is configured to determine optimal offloading of control tasks to different RSUs considering vehicle movement.

In some embodiments, the central base station is configured to determine expected task delay time for each task by dividing each geographic location into a number of sub sectors, calculating the data rate of a vehicle as an average sum of a number of location-based data rates that a vehicle is expected to pass through during the vehicle movement.

In some embodiments, the central base station is configured to determine, for each RSU-vehicle link, an expected receiving time of the executed task as a ratio of executed task size and an average sum of channel capacity of a respective RSU.

In some embodiments, the central base station is configured to determine an expected task computation time by each RSU by computing a ratio of a number of cycles required to compute the task and number of cycles available at the RSU, and the central base station is configured to receive and maintain a record of total task time, for all requested tasks, as a sum of expected task data rates between the vehicles and the RSUs, an expected delay time to return an executed task, and the expected task computation time.

In another exemplary embodiment, a system for scheduling tasks for traffic management of vehicles in a geographic area is described. The system includes a plurality of computer-controlled traffic signal devices, a plurality of the vehicles each having an advanced driver assistance system and cellular vehicle-to-everything (C-V2X) communication circuitry, a plurality of road side unit (RSU) nodes arranged at predetermined locations and configured to execute vehicle control tasks and traffic signal tasks. The system further includes a central base station configured to receive and dynamically maintain a record of vehicle task data rates for V2X links between the plurality of vehicles and the plurality of RSUs, as RSU-vehicle links, and delay times to return an executed vehicle task, and schedule offloading of the vehicle control tasks from the plurality of vehicles to the plurality of RSU nodes by way of the RSU-vehicle links. The RSUs are fog nodes for computing the vehicle control tasks and the traffic signal tasks in accordance with a schedule, and the vehicle control tasks are control tasks for the advanced driver assistance systems and the traffic signal tasks are traffic signal control tasks to manage traffic flow in the geographic area.

In some embodiments, each RSU is configured to maintain channel capacity data and data rate data of different geographic locations in an RSU communication range by periodically monitoring a signal quality of a vehicle to RSU link for each vehicle of the plurality of vehicles using the cellular vehicle-to-everything communication circuitry.

In some embodiments, each RSU is configured to maintain a history of data rates achieved by the plurality of vehicles as the plurality of vehicles move to different geographic locations within an RSU communication range.

In some embodiments, the central base station is configured to receive and maintain a history of variable data rates for the RSU-vehicle links.

In some embodiments, the central base station is configured to schedule offloading of the vehicle control tasks and execution of traffic signal tasks using a Hungarian-based algorithm for offloading of the vehicle tasks and execution of traffic signal tasks by different RSUs of the plurality of RSUs, and the central base station is configured to populate a cost matrix of the vehicle control tasks and traffic signal tasks for each vehicle-RSU link, and apply the Hungarian-based algorithm to schedule the offloading of vehicle control tasks and the traffic signal tasks to each RSU in a manner that minimizes a cost function.

In some embodiments, the central base station is configured to schedule offloading of vehicle tasks with minimum cost in terms of total task delay for each RSU-vehicle pair, computed as sum of an expected task data rate, an expected task computation time by a RSU, and an expected delay time to return an executed task.

In some embodiments, the central base station is configured to determine expected task computation time by each RSU by computing a ratio of a number of cycles required to compute the task and number of cycles available at the RSU, and the central base station is configured to receive and maintain a record of total task time, for vehicle control tasks and traffic signal tasks, as a sum of expected task data rates between the vehicles and traffic signals and the RSUs, an expected delay time to return an executed task, and the expected task computation time.

The foregoing general description of the illustrative embodiments and the following detailed description thereof are merely exemplary embodiments of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
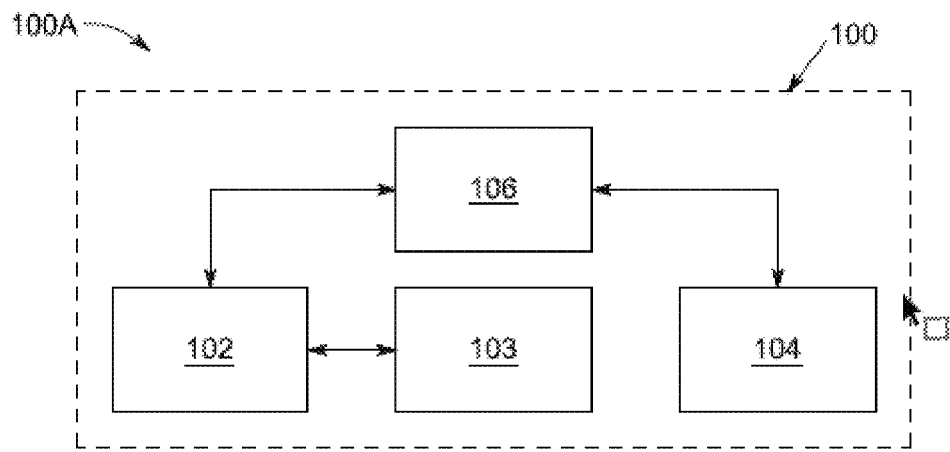
FIG. 1A is a block diagram of a system for scheduling offloading of vehicle tasks for vehicular advanced driver assistance systems (ADAS), in accordance with an exemplary embodiment of the present disclosure.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of the present disclosure are directed towards a system and a method for scheduling offloading of vehicle control tasks for vehicular advanced driver assistance systems (ADAS) and automated driving operations. The present disclosure provides a method and system to schedule offloading of vehicle tasks in vehicular fog computing networks. In an embodiment, the vehicular fog computing network is an approach that uses fog servers as part of or connected to road side units. The present disclosure considers vehicles' mobility and cellular vehicle-to-everything (V2X) link data rates and utilizes a Hungarian-based algorithm to schedule offloading of the vehicle tasks to appropriate road side units (RSUs) that minimize the total delay involved in the offloading of a vehicle control task. As such, the system and the method of the present disclosure provide time-efficient task scheduling in vehicular networks with the assistance of fog nodes. The system and the method use network data rates and mobility information to evaluate task scheduling costs for different fog nodes. The task scheduling cost is assessed in terms of the time required to compute the task by the fog node. In particular, the Hungarian-based algorithm is used to find the scheduling of task offloading that minimizes the total cost of the network.

Referring to FIG. 1A, a block diagram 100A of a system 100 for scheduling offloading of vehicle control tasks for vehicular advanced driver assistance systems (ADAS) and automated driving operations is illustrated, according to certain aspects. In general, ADAS are technologies that assist vehicle drivers in the safe operation of vehicles. ADAS may increase vehicle and road safety through a human-machine interface. By using automated technology, such as sensors and cameras, ADAS can detect nearby obstacles or driver errors and respond accordingly. Additionally, additional vehicle control systems may enable various levels of autonomous driving. These systems are developed to automate, adapt, and enhance vehicle technology for improved safety and driving, as most road crashes occur due to human error. In some cases, ADAS have been proven to reduce road fatalities by minimizing human error. Safety features are designed to avoid crashes and collisions by alerting the driver to potential problems, implementing safeguards, and taking control of the vehicle if necessary.

Subsequently, ADAS may include operations such as adaptive cruise control, driver assist control to avoid collisions, control to alert drivers to possible obstacles, control to warn drivers of lane departure, control to assist drivers in lane centering, control that incorporates satellite navigation, control to provide drivers with traffic warnings, control to provide drivers with navigational assistance through smartphones, control to automate lighting, or provide other features.

Vehicles must perform these control tasks, which may require complex computations that are beyond the computational capacity of the respective vehicle. Complex computations may include object recognition to help identify possible obstacles, and dynamically recognize a lane and location of a vehicle with the lane. Control to provide drivers with traffic warnings can be driven by way of recognizing traffic conditions with a camera or other sensors. In addition, the control with respect to traffic warnings can be performed based on data signals provided by other vehicles 102, road side units 104, and/or control instructions determined in the central base station 106.

In some aspects, the system 100 includes a number of various types of moving vehicles 102 having the ADAS 103. A person of ordinary skill in the art will understand that the number of vehicles 102 may be collectively referred to as the vehicles 102, and individually referred to as the vehicle 102. The number of various types of vehicles 102 are configured for diverse vehicle control tasks. The various vehicles 102 may include any number of commercial or private vehicles, each equipped with different configurations of ADAS 103. In particular, the system 100 is configured to schedule vehicle control tasks for the various types of vehicles 102 having different ADAS 103. Each of the various types of vehicles 102 has one or more vehicle control tasks that need to be executed for the ADAS 103 to work properly and efficiently. In other words, the various types of vehicles 102 may have control tasks that are necessary to be executed for making application related decisions.

ADAS 103 is increasing in functionality with an ultimate achievement of fully automated driving. As mentioned above, various levels of automated driving have been defined beginning with ADAS 103. A level of partial automation can include traffic jam assist and automated parking.

A level of conditional automation can include advanced emergency breaking and steering and remote parking. A level of high automation can include a highway autopilot mode of operation, a city autopilot operation, and valet parking A level of full automation can include an autopilot mode of operation. In the case of an autonomous driving applications installed in a vehicle 102, the control tasks may relate to deciding the application of and the degree of applying the brakes or continuation of driving in order to avoid obstacles present on a road where the vehicle 102 is being driven. The vehicle control tasks may relate to deciding the manner of acceleration of deceleration of the autonomous vehicle. The vehicle control tasks may relate to deciding steering of the autonomous vehicle. The vehicle control tasks are decided based on various forms of sensor data, including on-board sensors such as cameras, radar, sonar, as well as data from external sources including data from other vehicles, global positioning system (GPS) data, cellular messaging, to name a few. In a similar manner, the vehicle 102 may have other vehicle control tasks that need computation, such as fuel effective route selection, avoiding traffic incidents and jams, maximizing comfort, maximizing predictability, and the like.

In some aspects, the system 100 further includes a number of road side unit (RSU) nodes 104 arranged at predetermined locations to execute the vehicle control tasks. A person of ordinary skill in the art will understand that the number of RSU nodes 104 may be collectively referred to as the RSU nodes 104, and individually referred to as the RSU node 104. The number of RSU nodes 104 are alternatively referred to as the RSUs 104 for the sake of brevity in the explanation. In some aspects, the RSUs 104 are fog nodes for computing tasks in accordance with a schedule. In examples, the tasks are control tasks for the ADAS 103. In an aspect, a subset of the various vehicles 102 may request to offload a respective diverse task to an RSU 104 from amongst the RSUs 104.

In some aspects, each RSU 104 is configured to maintain data about its channel capacity and data rates of different geographic locations in its communication range by periodically monitoring signal quality of each vehicle to RSU link using cellular vehicle-to-everything (C-V2X) communication. In general, C-V2X describes wireless communication between a vehicle and any entity that may affect or may be affected by the vehicle. C-V2X depicts a vehicular communication system that is intended to improve road safety and traffic efficiency while reducing pollution and saving energy.

C-V2X leverages cellular network infrastructure for Vehicle-to-Network (V2N), Vehicle-to-Infrastructure (V2I), and Vehicle-to-Vehicle (V2V) connectivity. V2N connectivity uses a standard air interface known as Uu to connect from the vehicle to a cell site, where Uu generally refers to a logical interface between a user equipment (UE) and a base station. Vehicle-to-Infrastructure (V2I) connects vehicles to Roadside Units (RSU). Vehicle-to-Vehicle (V2V) connects vehicles to vehicles and is enabled by another cellular standard interface called PC5 or sidelink. The PC5 is a LTE-V2X standard as a refinement to LTE Sidelink for C-V2X and enables an LTE-based technology to be used by vehicles to communicate wirelessly with other vehicles.

In an embodiment, C-V2X applications are enabled by being hosted in Fog servers (also referred to as edge-based platforms) that can be co-located with Roadside Units (RSUs), at cellular base stations or in edge data centers. C-V2X enables various use cases. One use case can include road safety, with the aim of reducing death and injury for all road users. A second use case can include improving traffic flows and efficiency, to reduce congestion and pollution. A third use case is to provide information to drivers and other road users.

On the vehicle side of C-V2X, hardware chips can be configured with a cellular modem and RFFE (RF Front End) connectivity with Global Navigation Satellite System (GNSS) support into a module device. Combined with ITS software and antennas, these are integrated into Telematics Control Units (TCUs), which can be incorporated into the vehicles. The TCUs communicate with other vehicles, and with the roadside units or nearby cellular sites. As an example hardware chip, Qualcomm produces a system-on-a-chip (SoC) as a platform that vehicle OEMs can use to power advanced driver assistance systems and automated driving on the same hardware architecture. TCU suppliers integrate the ITS modules and antennas to create the onboard units that drive the C-V2X.

A platform that hosts data management and information, as well as data calculation, is located above the network, in an edge server, referred to herein as a central base station 106.

Referring to FIG. 1A, RSUs 104 are an integral part of the system 100 in order to provide enhanced computation capacity to the system 100. In other words, the various vehicles 102 are configured with various and limited computation capacity and each RSU 104 is configured with a computation capacity that is greater than the limited computation capacity of the various vehicles 102 and sufficient to compute a computationally complex task. In some aspects, the various vehicles 102 are configured for diverse driver assist tasks, and a subset of the various vehicles 102 can request to offload a respective diverse task to an RSU 104. The driver assist and automated driving tasks may refer to the exemplary tasks described above with respect to system 100. In an example, each RSU 104 is configured to compute the computationally complex task of object recognition in order to avoid obstacles. In another example, a computationally complex task can include route planning and automatic road navigation. Further, each RSU 104 is configured to maintain a history of data rates as they are achieved by the number of vehicles 102 as they move to different locations within its the communication range.

In addition, the system 100 includes a central base station 106. The central base station 106 stores information about all vehicles 102 and RSUs 104. In some aspects, the central base station 106 is configured to receive and dynamically maintain a record of task data rates between the various moving vehicles 102 and the RSUs 104 and delay time to return an executed task. The central base station 106 is configured to schedule offloading of computation of the tasks for the ADAS 103. Further, the central base station 106 is configured to receive and maintain a history of variable data rates for RSU-vehicle links. In an aspect, the central base station 106 is configured to schedule requested tasks using a Hungarian-based algorithm for tasks requested from the number of vehicles 102 by different ones of the RSUs 104. The central base station 106 is configured to populate a cost matrix of the tasks for each vehicle-RSU pair and apply the Hungarian-based algorithm to schedule requested tasks to be performed by each RSU 104 in a manner that minimizes a cost function.

In an aspect, the central base station 106 is configured to schedule offloading of requested tasks with minimum cost in terms of total task delay for each RSU-vehicle pair, computed as a sum of the expected task data rate, expected task computation time by a RSU 104, and the expected delay time to return an executed task. The central base station 106 is configured to determine optimal offloading of tasks to different RSUs 104 considering vehicle movement.

The central base station 106 is configured to determine expected task delay time for each task by dividing each geographic location into a number of sub sectors, calculating the data rate of a vehicle 102 of the number of vehicles 102 as an average sum of a number of location-based data rates that a vehicle 102 is expected to pass through during the vehicle movement. In other words, the expected task delay time is calculated separately for each vehicle 102 of the number of vehicles 102 present within the system 100. In addition, the task delay time may vary individually pertaining to each vehicle 102 of the number of vehicles 102 and therefore, the central base station 106 of the system 100 may determine an appropriate RSU 104 for a corresponding vehicle 102 depending upon the vicinity of the RSU 104 to the vehicle 102. The task data rates define the efficiency of the system 100, and hence it is vital to keep a record of task data rates associated with all tasks offloaded by the number of vehicles 102 to the RSUs 104. In addition, the delay time refers to the time delay present in the system 100 from receiving an offloaded task by the number of vehicles 102 to execute the task and return the executed task to the plurality of vehicles 102. The central base station 106 acts as a central server that is configured to store and process information pertaining to the RSUs 104 and the number of vehicles 102. In some aspects, the central base station 106 may facilitate efficient task offloading scheduling and reduce overall network delay.

In an aspect, the central base station 106 is configured to determine, for each RSU-vehicle pair, an expected receiving time of the executed task as a ratio of executed task size and an average sum of channel capacity of a respective RSU 104. The central base station 106 is configured to determine expected task computation time by each RSU 104 by computing a ratio of a number of cycles required to compute the task and number of cycles available at the RSU 104. The central base station 106 is configured to receive and maintain a record of total task time, for all requested tasks, as a sum of expected task data rates between the vehicles 102 and the RSUs 104, expected delay time to return an executed task, and the expected task computation time.

In order to achieve the aforementioned efficiency parameters, the system 100 employs an algorithm to schedule offloading of the tasks. The algorithm steps are explained in detail later in the present disclosure.

Figure 1B:
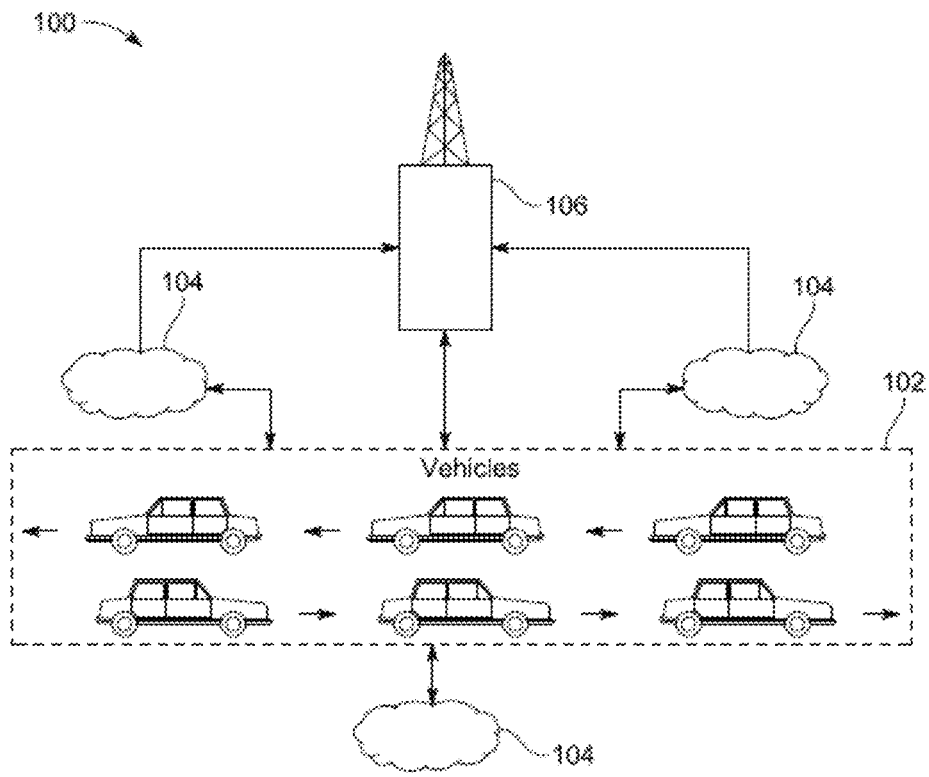
FIG. 1B is a schematic diagram of the system for scheduling offloading of vehicle tasks for the ADAS of FIG. 1A, in accordance with an exemplary embodiment of the present disclosure.

Referring to FIG. 1B, a schematic diagram of the system 100 for scheduling offloading of vehicle tasks for the ADAS 103 is illustrated, according to certain aspects. In particular, FIG. 1B depicts a schematic illustration of the components of the system 100 represented as blocks. However, the functionality and interaction of the components included in the system 100 of FIG. 1B remains identical to the components included in the system 100 of FIG. 1A.

Figure 2:
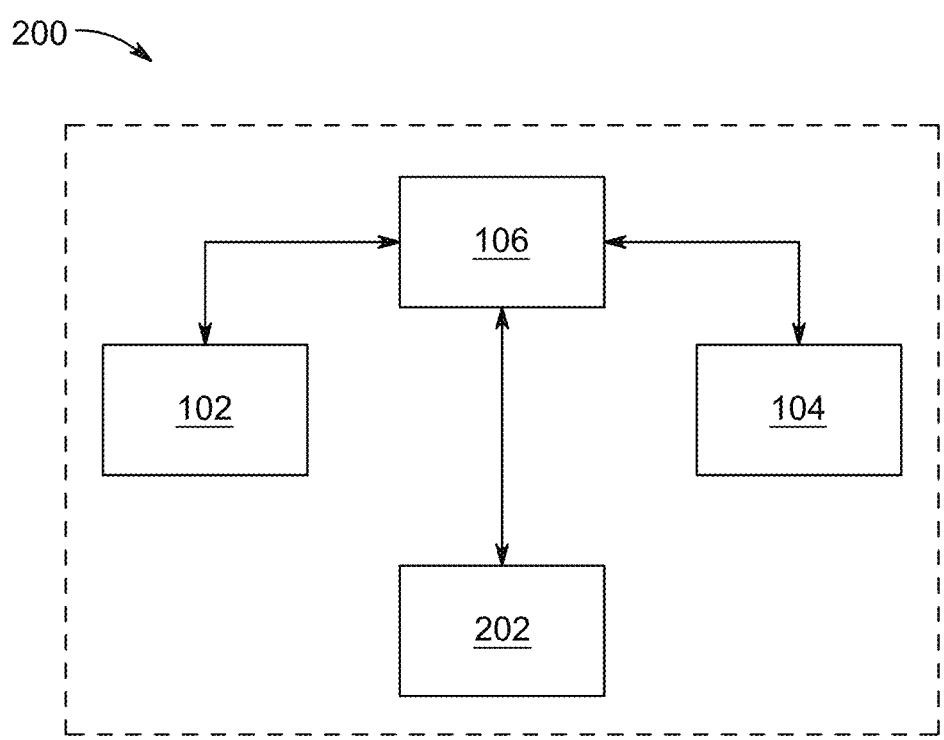
FIG. 2 is a block diagram of a system for scheduling control tasks for traffic management in a geographical area, in accordance with an exemplary embodiment of the present disclosure.

Referring to FIG. 2, a block diagram of an exemplary system 200 for scheduling control tasks for traffic management in a geographical area is illustrated, according to certain aspects. In particular, the system 200 is an exemplary implementation of the system 100. The system 200 of FIG. 2 has many similarities with the system 100 of FIG. 1A, such as, the key components included in the system 200 are similar to that of the system 100. Further, a general criteria of interaction of the key components included in the system 200 is similar to that of the system 100 of FIG. 1A. However, system 200 has certain extra components, that are explained, in detail in subsequent paragraph(s).

In some aspects, the system 200 is configured for scheduling control tasks for traffic management in a geographic area. In particular, the system 200 includes a number of computer-controlled traffic signal devices 202, the number of vehicles 102 having the ADAS 103, and the number of RSUs 104 arranged at predetermined locations to execute vehicle tasks and traffic signal tasks. Further, the system 200 includes the central base station 106 configured to receive and dynamically maintain a record of vehicle task data rates between the number of vehicles 102 and the RSUs 104 and delay time to return an executed vehicle task. Further, the central base station 106 of the system 200 is configured to schedule offloading of computation of the vehicle tasks for the ADAS 103.

Similar to the system 100 of FIG. 1A, the RSUs 104 of the system 200 are fog nodes for computing the vehicle tasks and traffic signal tasks in accordance with the schedule. As such, the RSUs 104 provide external computation capacity with on-site hardware to the number of vehicles 102 in order to execute complex data processing tasks. In particular, the number of vehicles 102 are connected to the number of RSUs 104 (present at predetermined locations) wirelessly to offload data processing tasks to the RSUs 104 for faster and efficient computation. In some aspects, the vehicles tasks are control tasks for the ADAS 103, and the traffic signal tasks are traffic signal control tasks to manage traffic flow in the geographic area. In one implementation of the system 200, the plurality of computer-controlled traffic signal devices 202 are controlled by the central base station 106, depending upon the task computation by the RSUs 104 of the system 200. The computer-controlled traffic signal devices 202 are configured to go green when there is a backing up of traffic and similarly, they are configured to go red as suited based upon the present traffic condition at the geographical area where the computer-controlled traffic signal devices 202 are installed.

According to an aspect, the central base station 106 is configured to schedule offloading of vehicle tasks and traffic signal tasks using a Hungarian-based algorithm for execution of the vehicle tasks and traffic signal tasks by different ones of the RSUs 104. The central base station 106 is configured to maintain a cost matrix of the vehicle tasks and traffic signal tasks for each vehicle-RSU pair and apply the Hungarian-based algorithm to schedule the vehicle tasks and the traffic signal tasks to be performed by each RSU 104 in a manner that minimizes a cost function. The central base station 106 is configured to schedule vehicle tasks with minimum cost in terms of total task delay for each RSU-vehicle pair, computed as sum of the expected task transfer data rate, expected task computation time by a RSU 104, and the expected delay time to return an executed task.

The central base station 106 is configured to determine expected task computation time by each RSU 104 by computing a ratio of a number of cycles required to compute the task and number of cycles available at the RSU 104. The central base station 106 is configured to receive and maintain a record of total task time, for vehicle tasks and traffic signal tasks, as a sum of task transfer data rates between the vehicles 102 and traffic signals and the RSUs 104, delay time to return an executed task, and the task computation time.

Figure 3A:
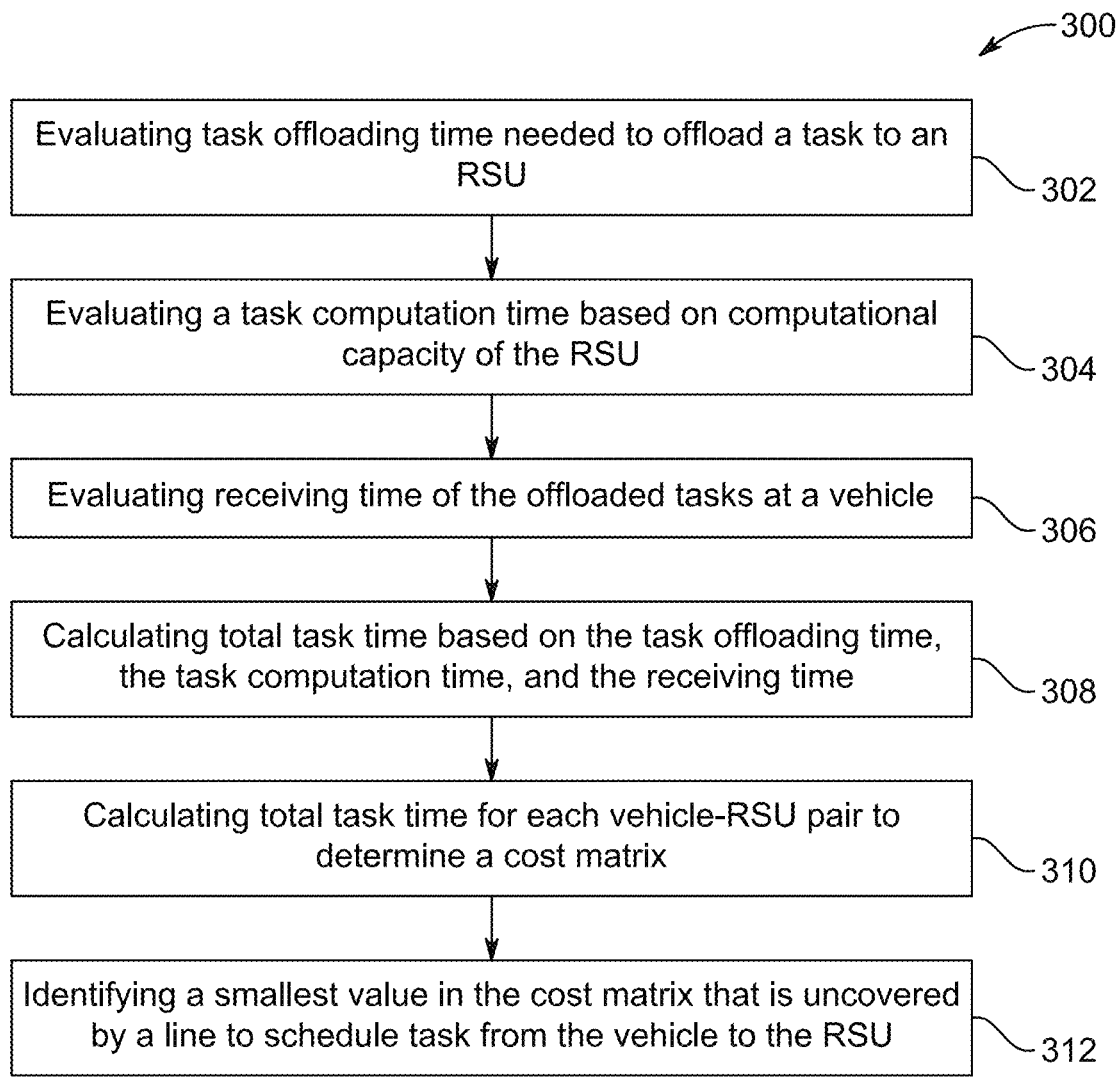
FIG. 3A is a detailed flow diagram of a method for scheduling offloading of tasks from a plurality of vehicles to road side units (RSUs), in accordance with an embodiment of the present disclosure.

Referring to FIG. 3A, a detailed flow diagram of a method 300 for scheduling offloading of tasks from the various vehicles 102 to allocated RSUs 104, according to certain aspects.

The order in which the method 300 is described is not intended to be construed as a limitation, and any number of the described method steps can be combined in any order to implement the method 300. Additionally, individual steps may be removed or skipped from the method 300 without departing from the spirit and scope of the present disclosure.

At step 302, the method 300 includes evaluating task offloading time needed to offload a task to the RSU 104. In some aspects, the task offloading time depends upon the data rate from the vehicle 102 to the RSU 104. The task offloading time may be calculated using Equation (1) provided below:

$$T_{V-F} = \frac{\text{Task Size}}{DR_{V-F}} \quad (1)$$

Figure 3B:
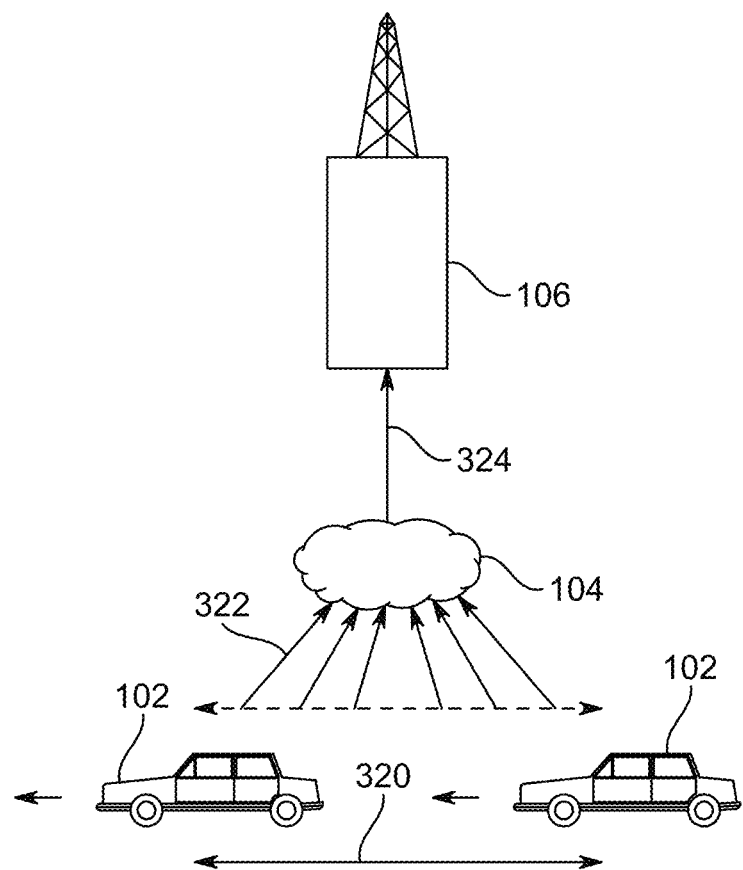
FIG. 3B is a schematic diagram depicting evaluation of average data rate for task transmission for system of FIG. 1A, in accordance with an exemplary embodiment of the present disclosure.

In the above Equation, $DR_{V-F}$ represents the data rate from the vehicle 102 to the RSU 104, 'V' represents the vehicle 102, and 'F' represents the fog node (i.e., the RSU 104). Due to moving vehicles and changing geographic locations, the channel capacity and, consequently, the data rate between the vehicle 102 and the RSU 104 may fluctuate. Each RSU 104 monitors the signal quality of each vehicle-to-RSU link using cellular vehicle-to-everything (V2X) communication. This allows the RSU 104 to track the channel capacity and data rates in various geographic locations within their communication range. The RSU 104 sends this information to the central base station 106. The central base station 106 stores updated information about data rates. The data rate in each geographic location is divided into a number of sub-sectors. In some aspects, FIG. 3B illustrates a schematic diagram depicting the evaluation of the expected average data rate during task transmission. In FIG. 3B, reference numeral "320" represents an expected total distance covered by the vehicle 102 during task transmission. Reference numeral "322" represents data rate values maintained by the RSU 104 as they are achieved by the vehicle 102 at different distance values during task transmission. As can be seen in FIG. 3B, the data rates are divided into a number of sub-sectors. Reference numeral "324" represents transmission of the data rate values to the central base station 106.

Figure 3C:
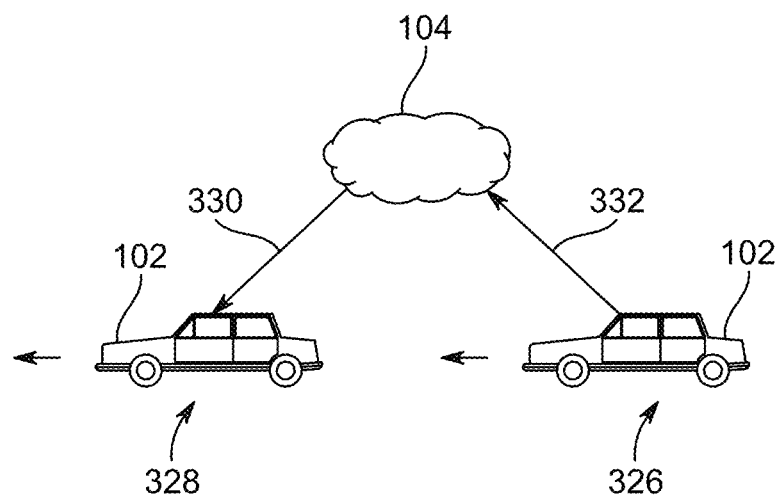
FIG. 3C is a schematic diagram depicting output retransmission to a vehicle from an RSU, in accordance with an exemplary embodiment of the present disclosure.

In an exemplary aspect, the data rate of the vehicle 102 ($V_i$) is calculated as the average sum of 'K' number of data rates in which a vehicle 102 ($V_i$) is expected to pass through during its uploading journey to the RSU 104 ($F_j$) as shown in FIG. 3C. In some aspects, FIG. 3C illustrates a schematic diagram depicting expected task output retransmission to the vehicle 102 ($V_i$) from the RSU 104 ($F_j$). In FIG. 3C, reference numeral "326" represents an initial position of the vehicle 102 when the task is transmitted, reference numeral "328" represents the task transmission from the vehicle 102 to the RSU 104. The task is computed at the RSU 104. Furthermore, reference numeral "330" represents expected task output retransmission from the RSU 104 to the vehicle 102, and reference numeral "332" represents predicted position of the vehicle 102 when the task is computed and ready for retransmission. In an aspect, the expected data rate of the vehicle 102 ($V_i$) is calculated using Equation (2) provided below.

$$DR(V_i - F_j) = \sum_{k=1}^{K} DR^k / K \quad (2)$$

In the above Equation, DR ($V_i$–$F_j$) represents the data rate from the vehicle 102 ($V_i$) to the RSU 104 ($F_j$).

At step 304, the method 300 includes evaluating a task computation time ($T_{comp}$) based on the computational capacity of the RSUs 104. In an example, it is assumed that all RSUs 104 have similar computational capacity. In one implementation, the central base station 106 is configured to determine task computation time by each RSU 104 by computing a ratio of a number of cycles required ($C_{req}$) to compute the task and number of cycles (C) available at the RSU 104. Further, the central base station 106 is configured to receive and maintain a record of total task time, for all requested tasks, as a sum of task data rates between the number of vehicles 102 and the RSUs 104, delay time to return an executed task, and the task computation time. In an aspect, the task computation time may be computed using Equation (3) provided below.

$$T_{comp} = \frac{C_{req}}{C} \quad (3)$$

At step 306, the method 300 includes evaluating receiving time of the offloaded tasks at the vehicle 102. The step 306 includes forwarding the executed offloaded tasks to the vehicle 102. In other words, when the tasks offloaded to the RSU 104 by the vehicle 102 are executed, the offloaded tasks are then transferred back to the vehicle 102 for optimal operational results and consistency. In some aspects, a time period of receiving the offloaded tasks by the vehicle 102 from the RSU 104 is referred to as receiving time ($T_{F-V}$). In an aspect, the central base station 106 is configured to determine, for each RSU-vehicle pair, the receiving time of the executed task as a ratio of executed task size and an average sum of channel capacity of a respective RSU 104. In an example, the receiving time of the vehicle may be calculated using Equation (4) provided below.

$$T_{F-V} = \frac{\text{Exec Size}}{DR_{F-V}} \quad (4)$$

In the above Equation, 'exec size' refers to the digital size of the executed task and '$DR_{F-V}$' refers to the data rate of the RSU 104 to the vehicle 102.

At step 308, the method 300 includes calculating expected total task time based on the expected time taken to offload the tasks as described at step 302, the time spent in computation of the offloaded task at step 304, and the expected time taken to return the executed task at step 306. In other words, the total task time as defined at step 308 may be calculated by addition of the time periods calculated at steps 302, 304, and 306. In an aspect, the total task time may be calculated based on Equation (5) provided below.

$$T_{total} = T_{V-F} + T_{comp} + T_{F-V} \quad (5)$$

At step 310, the method 300 includes calculating expected total task time for each vehicle-RSU pair to determine a cost matrix. The Hungarian algorithm (model) is applied to determine the optimal task scheduling that minimizes the cost function. As such, the Hungarian model is explained later in detail, with respect to FIG. 4. Referring back to step 310, each vehicle 102 of the number of vehicles 102 and each RSU 104 of the RSUs 104 form a pair and quantitative parameters defined at steps 302, 304, 306, and 308 of the method 300 are calculated for each pair of the number of vehicles 102 and the RSUs 104. In an aspect, a cost matrix is initially developed including 'F' rows and 'V' columns for V number of vehicles 102 and F number of RSUs of the RSUs 104. The cost matrix is updated to make it a square matrix. The number of rows of square matrix should be such that they should be divisible by the number of vehicles V. Each row will correspond to the RSU number calculated by row number remainder F. Furthermore, row minimum and column minimum are subtracted from each element of the matrix. Moreover, step 310 uses the minimum number of lines that cover the zero elements of the matrix are used. The goal is to cover all zeros using the least number of lines, either horizontal or vertical. If F number of lines are required for covering, optimal assignment is available along the 0 elements. In summary, step 310 of the method 300 is employed to minimize the cost. In other words, the central base station 106 is configured to schedule requested tasks with minimum cost in terms of total task delay for each RSU-vehicle pair, computed as sum of the expected task data rate, task computation time by the RSU 104, and the delay time to return an executed task.

At step 312, the method 300 includes identifying the smallest value in the cost matrix that is uncovered by a line. In other words, the smallest value present in the matrix is subtracted from all elements left uncovered. In addition, the smallest value is added to the elements that are covered by two lines, as such, intersection of horizontal lines and vertical lines. Hence at step 312, additional zeros in the cost matrix are calculated, thus allowing further reduction. In one implementation of the method 300, step 310 and step 312 are repeated until an optimal assignment is available. In conclusion, at step 312, the tasks are scheduled for offloading from the number of vehicles 102 to allocated RSUs 104.

In some implementations of the system 100, the central base station 106 is configured to schedule requested tasks using the Hungarian-based algorithm for tasks requested from the number of vehicles 102 by different ones of the RSUs 104. As such, the central base station 106 is configured to populate the cost matrix, as defined in method 300, of the tasks for each vehicle-RSU pair and apply the Hungarian-based algorithm to schedule offloading of requested tasks to be performed by each RSU 104 in a manner that minimizes the cost function.

Figure 4:
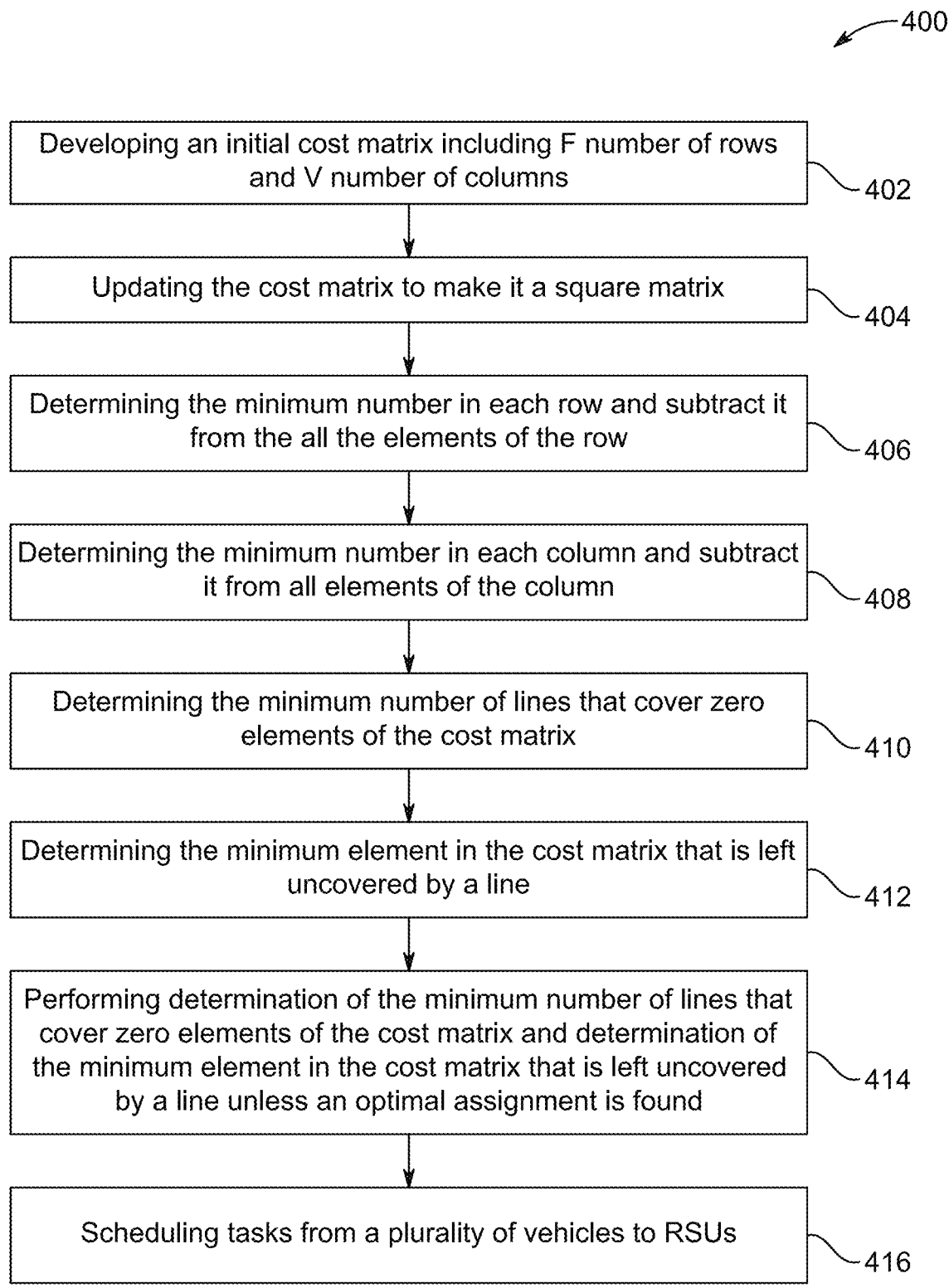
FIG. 4 is a schematic flow chart depicting a method for a Hungarian-based algorithm used in the system of FIG. 1A for scheduling offloading of tasks from vehicles to the RSUs, in accordance with an exemplary embodiment of the present disclosure.

Referring to FIG. 4, a schematic flow chart of a method 400 for a Hungarian-based algorithm for scheduling offloading of tasks from vehicles 102 to the RSUs 104 is illustrated, according to certain aspects. The order in which the method 400 is described is not intended to be construed as a limitation, and any number of the described method steps can be combined in any order to implement the method 400. Additionally, individual steps may be removed or skipped from the method 400 without departing from the spirit and scope of the present disclosure.

At step 402, the method 400 includes developing an initial cost matrix including F number of rows and V number of columns. In particular, the F number of rows refers to the number of RSUs 104 and the V number of columns refer to the plurality of vehicles 102. The cost matrix refers to an analytical parameter developed to execute the task and improve the efficiency of the system 100.

At step 404, the method 400 includes updating the cost matrix, developed at step 402, in order to convert the cost matrix into a square matrix. The number of rows (F) of the square cost matrix are such that they are divisible by the number of columns (V).

At step 406, the method 400 includes determining the minimum number in each row and subtract it from all of the elements of the row. In particular, at step 406, the central base station 106 determines the RSU 104 with the least amount of data traffic and further assigns the task to be offloaded to that particular RSU 104.

At step 408, the method 400 includes determining the minimum number in each column and subtract it from all elements of the column. In particular, at step 408, the central base station 106 figures out the vehicles 102 with the least taxing task.

At step 410, the method 400 includes determining the minimum number of lines that cover zero elements of the cost matrix developed at step 402. In one implementation, if F number of lines are required for covering the zero elements, optimal assignment is available along the zero elements. However, if F number of lines are unable to cover the zero elements, then further processing is required, detailed further in the method 400.

At step 412, the method 400 includes determining the minimum element in the cost matrix that is left uncovered by a line, at the step 410. The value of the minimum element is subtracted from other elements that are uncovered. Further, this value may be added to the elements covered by two lines, that is, an intersection of horizontal lines and vertical lines. In some aspects, the step 412 creates additional zeroes in the cost matrix, thus allowing for further reduction in task assignment time and improvement of the efficiency of the system 100.

At step 414, the method includes performing step 410 and 412 again, unless an optimal assignment is found. In other words, the central base station 106 of the system 100 implements steps 410 and 412 of the method 400 until the optimal task for offloading is found for delivery to the RSUs 104.

At step 416, the method 400 includes scheduling offloading of tasks from the vehicles 102 to the RSUs 104. In particular, step 416 is the final step of the method 400. After the method 400, in conjunction with the method 300, is executed by the central base station 106, the system 100 schedules offloading of vehicle tasks for vehicular ADAS 103.

Figure 5:
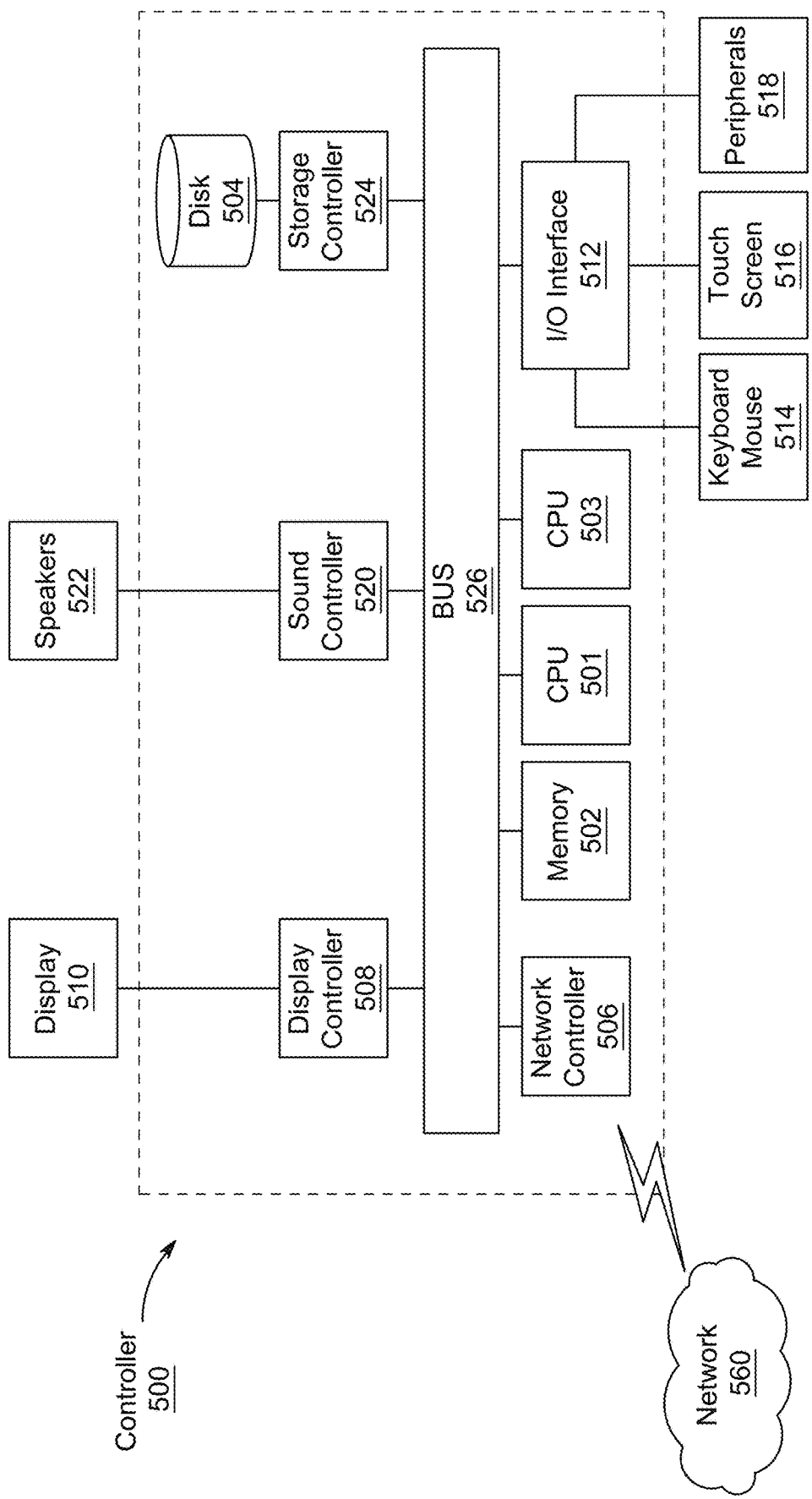
FIG. 5 is an illustration of a non-limiting example of details of computing hardware used in a computing system of the system for scheduling vehicular tasks, in accordance with certain embodiments.

Next, further details of the hardware description of the computing environments described in the system 100 and the system 200, according to exemplary aspects is described with reference to FIG. 5. In FIG. 5, a controller 500 is described is representative of the system 100, 200 of FIG. 1A and FIG. 2, in which the controller is a computing device which includes a CPU 501 which performs the processes described above/below. The process data and instructions may be stored in memory 502. These processes and instructions may also be stored on a storage medium disk 504 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 501, 503 and an operating system such as Microsoft Windows 7, Microsoft Windows 10, Microsoft Windows 11, UNIX, Solaris, LINUX, Apple MAC-OS and other systems known to those skilled in the art.

The hardware elements in order to achieve the computing device may be realized by various circuitry elements, known to those skilled in the art. For example, CPU 501 or CPU 503 may be a Xenon or Core processor from Intel of America or an Opteron processor from AMD of America, or may be other processor types that would be recognized by one of ordinary skill in the art. Alternatively, the CPU 501, 503 may be implemented on an FPGA, ASIC, PLD or using discrete logic circuits, as one of ordinary skill in the art would recognize. Further, CPU 501, 503 may be implemented as multiple processors cooperatively working in parallel to perform the instructions of the inventive processes described above.

The computing device in FIG. 5 also includes a network controller 506, such as an Intel Ethernet PRO network interface card from Intel Corporation of America, for interfacing with network 560. As can be appreciated, the network 560 can be a public network, such as the Internet, or a private network such as an LAN or WAN network, or any combination thereof and can also include PSTN or ISDN subnetworks. The network 560 can also be wired, such as an Ethernet network, or can be wireless such as a cellular network including EDGE, 3G, 4G and 5G wireless cellular systems. The wireless network can also be Wi-Fi, Bluetooth, or any other wireless form of communication that is known.

The computing device further includes a display controller 508, such as a NVIDIA GeForce GTX or Quadro graphics adaptor from NVIDIA Corporation of America for interfacing with display 510, such as a Hewlett Packard HPL2445w LCD monitor. A general purpose I/O interface 512 interfaces with a keyboard and/or mouse 514 as well as a touch screen panel 516 on or separate from display 510. General purpose I/O interface also connects to a variety of peripherals 518 including printers and scanners, such as an OfficeJet or DeskJet from Hewlett Packard.

A sound controller 520 is also provided in the computing device such as Sound Blaster X-Fi Titanium from Creative, to interface with speakers/microphone 522 thereby providing sounds and/or music.

The general purpose storage controller 524 connects the storage medium disk 504 with communication bus 526, which may be an ISA, EISA, VESA, PCI, or similar, for interconnecting all of the components of the computing device. A description of the general features and functionality of the display 510, keyboard and/or mouse 514, as well as the display controller 508, storage controller 524, network controller 506, sound controller 520, and general purpose I/O interface 512 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 6.

Figure 6:
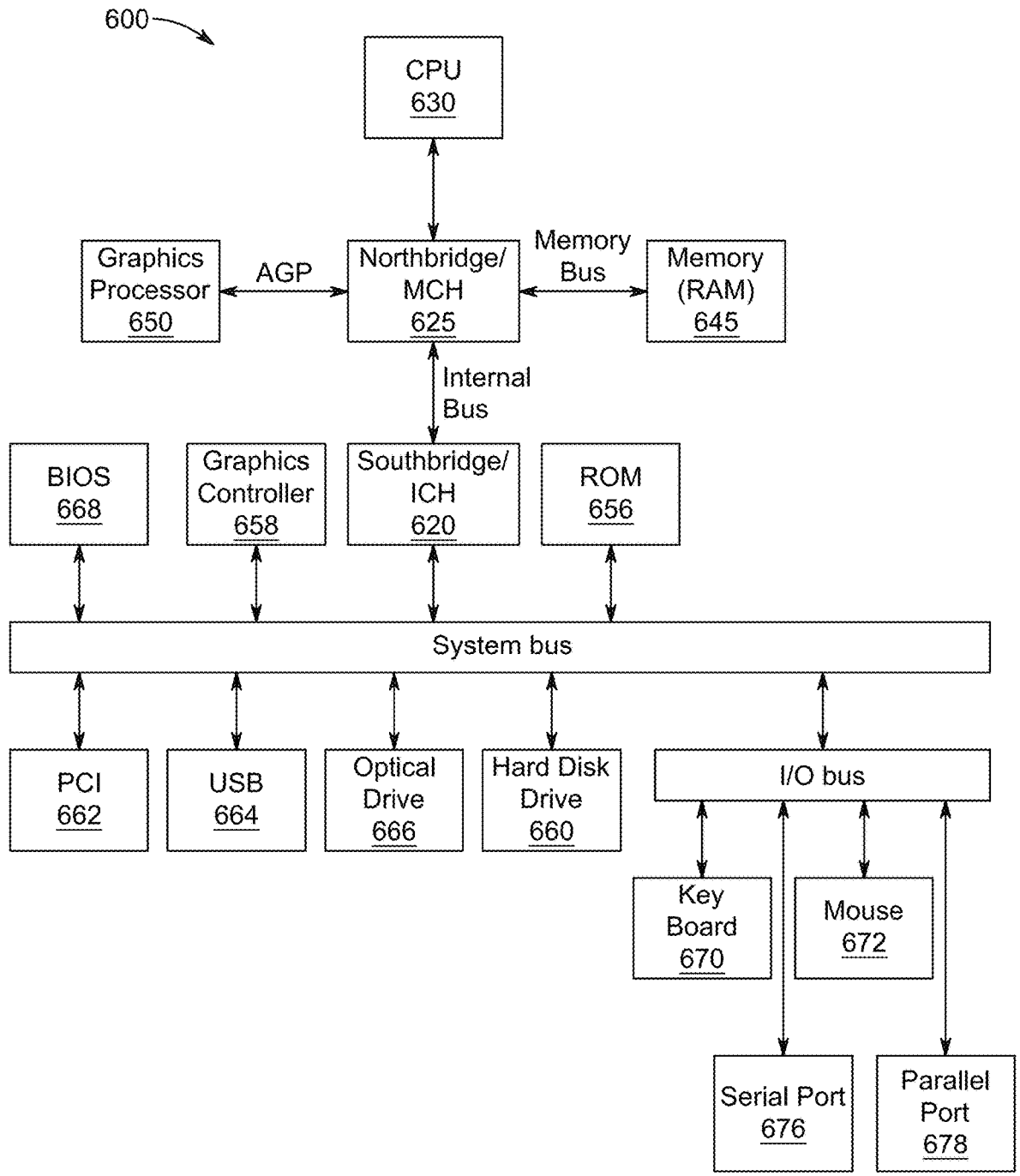
FIG. 6 is an exemplary schematic diagram of a data processing system used within the computing system, in accordance with certain embodiments.

FIG. 6 shows a schematic diagram of a data processing system, according to certain embodiments, for performing the functions of the exemplary embodiments. The data processing system is an example of a computer in which code or instructions implementing the processes of the illustrative embodiments may be located.

In FIG. 6, data processing system 600 employs a hub architecture including a north bridge and memory controller hub (NB/MCH) 625 and a south bridge and input/output (I/O) controller hub (SB/ICH) 620. The central processing unit (CPU) 630 is connected to NB/MCH 625. The NB/MCH 625 also connects to the memory 645 via a memory bus and connects to the graphics processor 650 via an accelerated graphics port (AGP). The NB/MCH 625 also connects to the SB/ICH 620 via an internal bus (e.g., a unified media interface or a direct media interface). The CPU Processing unit 630 may contain one or more processors and even may be implemented using one or more heterogeneous processor systems.

Figure 7:
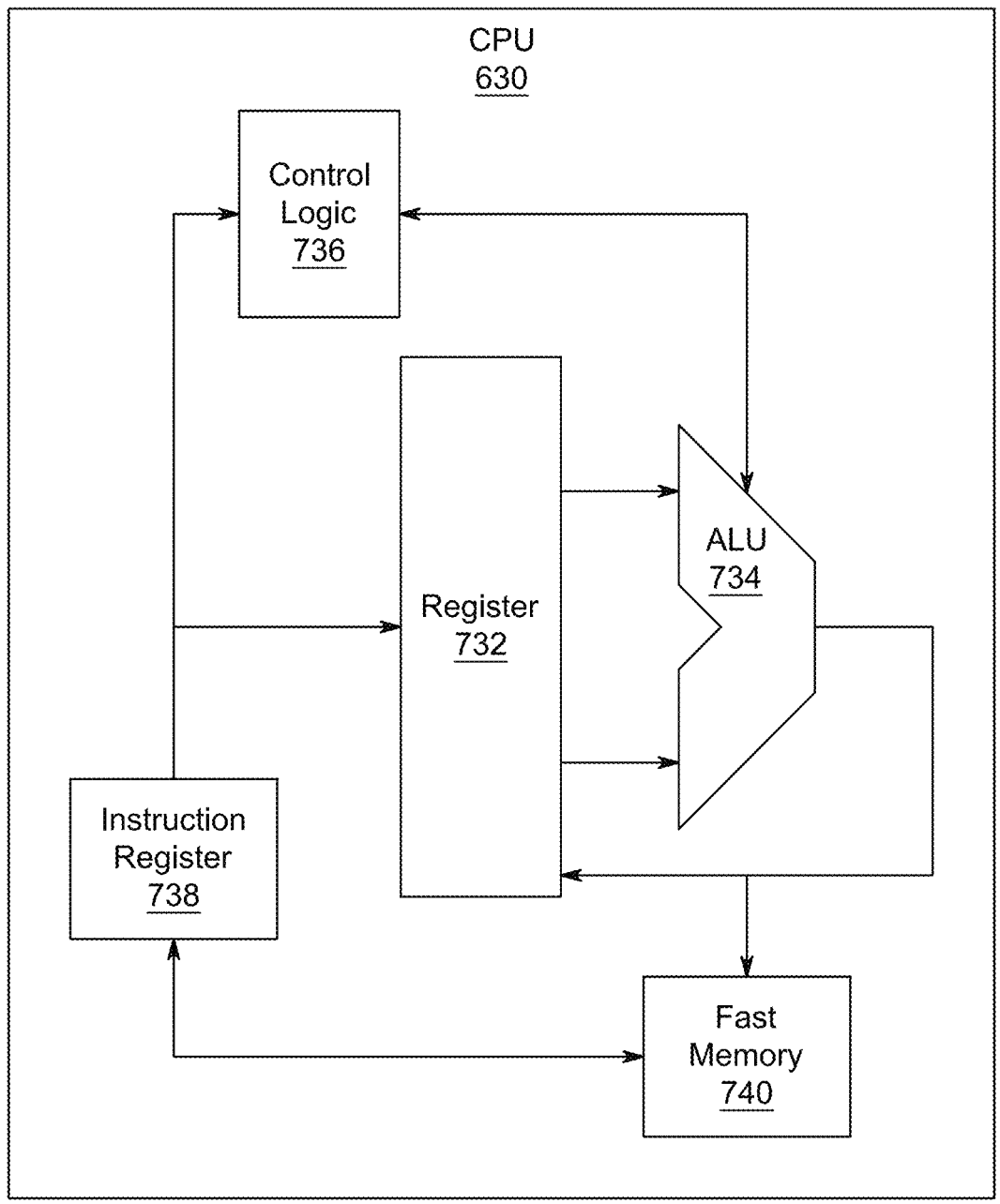
FIG. 7 is an exemplary schematic diagram of a processor used with the computing system, in accordance with certain embodiments.

For example, FIG. 7 shows one implementation of CPU 630. In one implementation, the instruction register 738 retrieves instructions from the fast memory 740. At least part of these instructions are fetched from the instruction register 738 by the control logic 736 and interpreted according to the instruction set architecture of the CPU 630. Part of the instructions can also be directed to the register 732. In one implementation the instructions are decoded according to a hardwired method, and in another implementation the instructions are decoded according to a microprogram that translates instructions into sets of CPU configuration signals that are applied sequentially over multiple clock pulses. After fetching and decoding the instructions, the instructions are executed using the arithmetic logic unit (ALU) 734 that loads values from the register 732 and performs logical and mathematical operations on the loaded values according to the instructions. The results from these operations can be feedback into the register and/or stored in the fast memory 740. According to certain implementations, the instruction set architecture of the CPU 630 can use a reduced instruction set architecture, a complex instruction set architecture, a vector processor architecture, a very large instruction word architecture. Furthermore, the CPU 630 can be based on the Von Neuman model or the Harvard model. The CPU 630 can be a digital signal processor, an FPGA, an ASIC, a PLA, a PLD, or a CPLD. Further, the CPU 630 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 6, the data processing system 600 can include that the SB/ICH 620 is coupled through a system bus to an I/O Bus, a read only memory (ROM) 656, universal serial bus (USB) port 664, a flash binary input/output system (BIOS) 668, and a graphics controller 658. PCI/PCIe devices can also be coupled to SB/ICH 688 through a PCI bus 662.

The PCI devices may include, for example, Ethernet adapters, add-in cards, and PC cards for notebook computers. The Hard disk drive 660 and CD-ROM 666 can use, for example, an integrated drive electronics (IDE) or serial advanced technology attachment (SATA) interface. In one implementation the I/O bus can include a super I/O (SIO) device.

Further, the hard disk drive (HDD) 660 and optical drive 666 can also be coupled to the SB/ICH 620 through a system bus. In one implementation, a keyboard 670, a mouse 672, a parallel port 678, and a serial port 676 can be connected to the system bus through the I/O bus. Other peripherals and devices that can be connected to the SB/ICH 620 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

Figure 8:
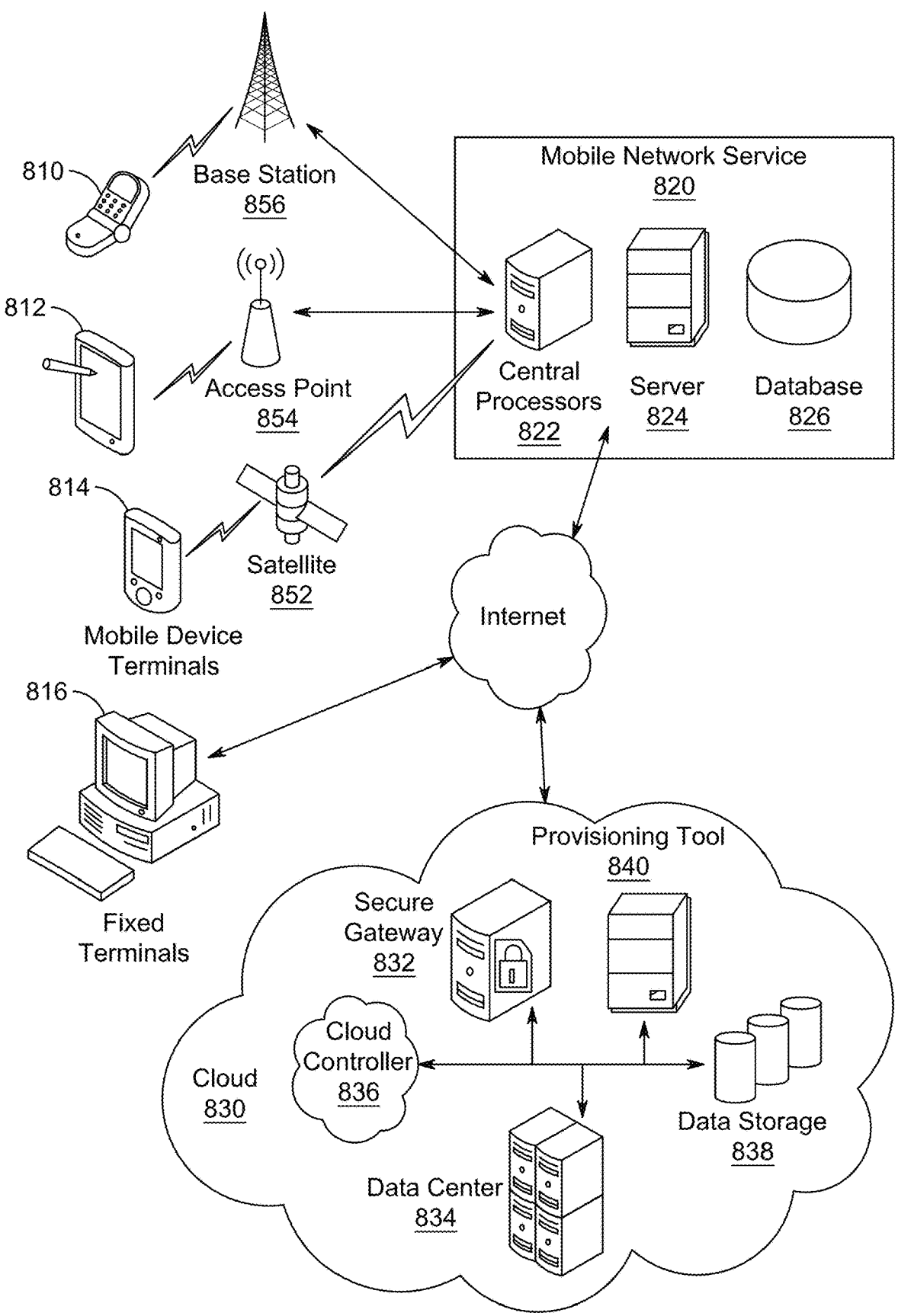
FIG. 8 is an illustration of a non-limiting example of distributed components which may share processing with the controller, in accordance with certain embodiments.

The functions and features described herein may also be executed by various distributed components of a system. For example, one or more processors may execute these system functions, wherein the processors are distributed across multiple components communicating in a network. The distributed components may include one or more client and server machines, such as cloud 830 including a cloud controller 836, a secure gateway 832, a data center 834, data storage 838 and a provisioning tool 840, and mobile network services 820 including central processors 822, a server 824 and a database 826, which may share processing, as shown by FIG. 8, in addition to various human interface and communication devices (e.g., display monitors 816, smart phones 810, tablets 812, personal digital assistants (PDAs) 814). The network may be a private network, such as a LAN, satellite 852 or WAN 854, or be a public network, may such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Numerous modifications and variations of the present disclosure are possible in light of the above teachings. It is therefore to be understood that the invention may be practiced otherwise than as specifically described herein.

The invention claimed is:

1. A system for scheduling vehicle tasks for vehicles, comprising:
   a plurality of vehicles each having an advanced driver assistance system and cellular vehicle-to-everything (C-V2X) communication circuitry;
   a plurality of road side unit (RSU) nodes arranged at predetermined locations and configured to execute driver assist control tasks for the plurality of vehicles; and
   a central base station configured to:
      receive and dynamically maintain a record of task data rates for C-V2X links between the plurality of vehicles and the plurality of RSUs, as RSU-vehicle links, and delay times to return an executed task, and
      schedule offloading of the control tasks from the plurality of vehicles to the RSU nodes by way of the RSU-vehicle links,
   wherein the RSUs are fog nodes for computing the control tasks in accordance with a schedule,
   wherein each RSU is configured to maintain a history of data rates achieved by the plurality of vehicles as the plurality of vehicles move to different geographic locations within an RSU communication range.

2. The system of claim 1, wherein the plurality of vehicles are configured for diverse driver assist tasks, and
   wherein a subset of the plurality of vehicles request to offload a respective diverse control task to an RSU.

3. The system of claim 1, wherein each RSU is configured to maintain channel capacity data and data rate data of different geographic locations in an RSU communication range by periodically monitoring a signal quality of a vehicle to RSU link for each vehicle of the plurality of vehicles using the cellular vehicle-to-everything communication circuitry.

4. The system of claim 1, wherein the plurality of vehicles are configured with a limited computation capacity and each RSU is configured with a computation capacity that is greater than the limited computation capacity of the plurality of vehicles.

5. The system of claim 4, wherein each RSU is configured to compute object recognition in order to avoid obstacles.

6. A system for scheduling vehicle tasks for vehicles, comprising:
   a plurality of vehicles each having an advanced driver assistance system and cellular vehicle-to-everything (C-V2X) communication circuitry;
   a plurality of road side unit (RSU) nodes arranged at predetermined locations and configured to execute driver assist control tasks for the plurality of vehicles; and
   a central base station configured to:
      receive and dynamically maintain a record of task data rates for C-V2X links between the plurality of vehicles and the plurality of RSUs, as RSU-vehicle links, and delay times to return an executed task, and
      schedule offloading of the control tasks from the plurality of vehicles to the RSU nodes by way of the RSU-vehicle links,
   wherein the RSUs are fog nodes for computing the control tasks in accordance with a schedule,
   wherein the central base station is configured to receive and maintain a history of variable data rates for the RSU-vehicle links.

7. The system of claim 1, wherein the central base station is configured to schedule requested offloading of the control tasks using a Hungarian-based algorithm for requested control tasks for offloading from the plurality of vehicles by different RSUs of the plurality of RSUs, and
   wherein the central base station is configured to populate a cost matrix of the control tasks for each vehicle-RSU link and apply the Hungarian-based algorithm to schedule requested tasks for offloading to each RSU in a manner that minimizes a cost function.

8. The system of claim 1, wherein the central base station is configured to schedule offloading of requested tasks with minimum cost in terms of total task delay for each RSU-vehicle link, computed as sum of an expected task data rate, an expected task computation time by a RSU, and an expected delay time to return an executed task.

9. The system of claim 1, wherein the central base station is configured to determine optimal offloading of control tasks to different RSUs considering vehicle movement.

10. The system of claim 9, wherein the central base station is configured to determine expected task delay time for each task by dividing each geographic location into a number of sub sectors, calculating the data rate of a vehicle as an average sum of a number of location-based data rates that a vehicle is expected to pass through during the vehicle movement.

11. The system of claim 1, wherein the central base station is configured to determine, for each RSU-vehicle link, an expected receiving time of the executed task as a ratio of executed task size and an average sum of channel capacity of a respective RSU.

12. The system of claim 1, wherein the central base station is configured to determine an expected task computation time by each RSU by computing a ratio of a number of cycles required to compute the task and number of cycles available at the RSU, and
   wherein the central base station is configured to receive and maintain a record of total task time, for all requested tasks, as a sum of expected task data rates between the vehicles and the RSUs, an expected delay time to return an executed task, and the expected task computation time.

13. A system for scheduling control tasks for traffic management of vehicles in a geographic area, comprising:
a plurality of computer-controlled traffic signal devices;
a plurality of the vehicles each having an advanced driver assistance system and cellular vehicle-to-everything communication (C-V2X) circuitry;
a plurality of road side unit (RSU) nodes arranged at predetermined locations and configured to execute vehicle control tasks and traffic signal tasks; and
a central base station configured to:
receive and dynamically maintain a record of vehicle task data rates for V2X links between the plurality of vehicles and the plurality of RSUs, as RSU-vehicle links, and delay times to return an executed vehicle task, and
schedule offloading of the vehicle control tasks from the plurality of vehicles to the plurality of RSU nodes by way of the RSU-vehicle links,
wherein the RSUs are fog nodes for computing the vehicle control tasks and the traffic signal tasks in accordance with a schedule, and
wherein the vehicle control tasks are control tasks for the advanced driver assistance systems and the traffic signal tasks are traffic signal control tasks to manage traffic flow in the geographic area,
wherein each RSU is configured to maintain a history of data rates achieved by the plurality of vehicles as the plurality of vehicles move to different geographic locations within an RSU communication range.

14. The system of claim 13, wherein each RSU is configured to maintain channel capacity data and data rate data of different geographic locations in an RSU communication range by periodically monitoring a signal quality of a vehicle to RSU link for each vehicle of the plurality of vehicles using the cellular vehicle-to-everything communication circuitry.

15. The system of claim 13, wherein the central base station is configured to receive and maintain a history of variable data rates for the RSU-vehicle links.

16. The system of claim 13, wherein the central base station is configured to schedule offloading of the control vehicle tasks and traffic signal tasks using a Hungarian-based algorithm for offloading of the vehicle tasks and execution of traffic signal tasks by different RSUs of the plurality of RSUs, and
wherein the central base station is configured to populate a cost matrix of the vehicle control tasks and traffic signal tasks for each vehicle-RSU link, and apply the Hungarian-based algorithm to schedule the offloading of vehicle control tasks and the traffic signal tasks to each RSU in a manner that minimizes a cost function.

17. The system of claim 13, wherein the central base station is configured to schedule offloading of vehicle tasks with minimum cost in terms of total task delay for each RSU-vehicle link, computed as sum of an expected task data rate, an expected task computation time by a RSU, and an expected delay time to return an executed task.

18. The system of claim 13, wherein the central base station is configured to determine expected task computation time by each RSU by computing a ratio of a number of cycles required to compute the task and number of cycles available at the RSU, and
wherein the central base station is configured to receive and maintain a record of total task time, for vehicle control tasks and traffic signal tasks, as a sum of expected task data rates between the vehicles and traffic signals and the RSUs, an expected delay time to return an executed task, and the expected task computation time.

* * * * *